(12) United States Patent
Boldyrev et al.

(10) Patent No.: US 8,271,433 B2
(45) Date of Patent: Sep. 18, 2012

(54) METHOD AND APPARATUS FOR PROVIDING AUTOMATIC CONTROLLED VALUE EXPANSION OF INFORMATION

(75) Inventors: Sergey Boldyrev, Söderkulla (FI); Jukka Honkola, Espoo (FI); Vesa Veikko Luukkala, Espoo (FI)

(73) Assignee: Nokia Corporation, Espoo (FI)

( * ) Notice: Subject to any disclaimer, the term of this patent is extended or adjusted under 35 U.S.C. 154(b) by 312 days.

(21) Appl. No.: 12/649,534

(22) Filed: Dec. 30, 2009

(65) Prior Publication Data
US 2011/0161285 A1   Jun. 30, 2011

(51) Int. Cl.
*G06F 7/00* (2006.01)
*G06F 17/00* (2006.01)
(52) U.S. Cl. .................................................. 707/609
(58) Field of Classification Search .................. None
See application file for complete search history.

(56) References Cited

U.S. PATENT DOCUMENTS

| | | | |
|---|---|---|---|
| 5,511,210 A | | 4/1996 | Nishikawa et al. |
| 2005/0283711 A1* | | 12/2005 | Claseman ............... 714/759 |
| 2006/0265391 A1* | | 11/2006 | Posner et al. ............ 707/10 |
| 2010/0058326 A1 | | 3/2010 | Dei et al. |
| 2010/0082651 A1 | | 4/2010 | Akolkar et al. |
| 2010/0198841 A1 | | 8/2010 | Parker et al. |

FOREIGN PATENT DOCUMENTS

| | | | |
|---|---|---|---|
| JP | 2009-104276 A | 5/2009 | |
| WO | WO 2010/033346 A2 | 3/2010 | |

OTHER PUBLICATIONS

Binary Decision Diagram. Accessed: Mar. 31, 2010, http://en.wikipedia.org/wiki/Binary_decision_diagram. pp. 1-4.
Representational State Transfer. Accessed: Mar. 31, 2010, http://en.wikipedia.org/wiki/REST. pp. 1-7.
A Mechanism for Managing and Distributing Information and Queries in a Smart Space Environment, Boldyrev et al., in: Ubiquitous Computing and Communication Journal, Special Issue of the 1st International Workshop on Managing Data with Mobile Devices (MDMD 2009), Jul. 30, 2009, pp. 1-10.
Approaching the design of interoperable smart environment applications, Spadini et al., 2nd International NoTA Conference, Sep. 30-Oct. 1, 2009, pp. 1-30.
Cross-Domain Interoperability: A Case Study, Honkola et al., NEW2AN/ruSMART 2009, LNCS 5764, Springer-Verlag 2009, pp. 22-31.

(Continued)

*Primary Examiner* — Uyen T. Le
(74) *Attorney, Agent, or Firm* — Ditthavong Mori & Steiner, P.C.

(57) ABSTRACT

An approach is provided for automatic controlled value expansion of information. A value expansion controller detects a request at a device to perform an information operation on a set of data elements of an information space, wherein the request identifies the set by a name and the information operation applies to each data element within the set. The value expansion controller intercepts the request based on the detection and determines the location of the data elements within a communication network based on the name. The value expansion controller retrieves the data elements from the location and populates an expansion table with the retrieved data elements, wherein the expansion table is correlated to the set. The value expansion controller performs the information operation on each data element in the expansion table and causes transmission of one or more results of the information operation to the device.

20 Claims, 12 Drawing Sheets

OTHER PUBLICATIONS

Determining Information Signatures in Smart Spaces, Boldyrev et al., 2009 IEEE International Conference on Semantic Computing, Sep. 14-16, 2009, http://ieeexplore.ieee.org/stamps/stamp.jsp?tp=&arnumber=5298636, pp. 291-296.

Distributed Architecture of a Professional Social Network on top of M3 Smart Space Solution made in PCs and Mobile Devices Friendly Manner, Balandin et al., 2009 Third International Conference on Mobile Ubiquitous Computing, Systems, Services and Technologies, pp. 318-323.

International search report and written opinion for corresponding international application No. PCT/FI2010/050839 dated Feb. 18, 2011, pp. 1-11.

Operations on Spaces of Information, Oliver et al., IEEE International Conference on Semantic Computing, Sep. 14-16, 2009, pp. 267-274.

* cited by examiner

400

METHOD AND APPARATUS FOR PROVIDING AUTOMATIC CONTROLLED VALUE EXPANSION OF INFORMATION

BACKGROUND

Modern users rely on a host of connected devices and services such as Internet-enabled mobile devices, personal computers, servers, applications, and the like, for information storage and processing. As part of this trend, service providers and device manufacturers are combining and providing interoperability among these myriad information processing devices, applications, and services. More specifically, one area of development has been the processing of information through numerous, individual and personal spaces in which persons, groups of persons, etc. can place, share, interact and manipulate webs of information with their own locally agreed semantics without necessarily conforming to an unobtainable, global whole. These information spaces, often referred to as smart spaces, are projections of the 'Giant Global Graph' in which one can apply semantics and reasoning at a local level. In one embodiment, information spaces are made of distributed components of information which are stored, maintained and processed in different forms by systems having different architectures and using different technologies. However, because of the distributed nature of such information, information may need to be transferred from device or system to another for access or processing, thereby using valuable network bandwidth and resources. As a result, service providers and device manufacturers face significant technical challenges in reducing the amount of network resources for information processing.

SOME EXAMPLE EMBODIMENTS

Therefore, there is a need for an approach for providing automatic controlled value expansion of information contained within information spaces.

According to one embodiment, a method comprises acting on a request to perform an information operation on a set of data elements of an information space. The request identifies the set by a name and the information operation applies to one or more data elements within the set. The method also comprises determining a location of the one or more data elements based on the name. The method further comprises causing, at least in part, retrieval of the one or more data elements from the location. The method further comprises populating an expansion table with at least the retrieved data elements, wherein the expansion table is at least substantially correlated to the set. The method further comprises performing the information operation on all or a portion of the retrieved data elements in the expansion table.

According to another embodiment, an apparatus comprising at least one processor, and at least one memory including computer program code, the at least one memory and the computer program code configured to, with the at least one processor, cause, at least in part, the apparatus to act on a request to perform an information operation on a set of data elements of an information space. The request identifies the set by a name and the information operation applies to one or more data elements within the set. The apparatus is also caused to determine a location of the one or more data elements based on the name. The apparatus further causes, at least in part, retrieval of the one or more data elements from the location. The apparatus is further caused to populate an expansion table with at least the retrieved data elements, wherein the expansion table is at least substantially correlated to the set. The apparatus is further caused to perform the information operation on all or a portion of the retrieved data elements in the expansion table.

According to another embodiment, a computer-readable storage medium carrying one or more sequences of one or more instructions which, when executed by one or more processors, cause, at least in part, an apparatus to act on a request to perform an information operation on a set of data elements of an information space. The request identifies the set by a name and the information operation applies to one or more data elements within the set. The apparatus is also caused to determine a location of the one or more data elements based on the name. The apparatus further causes, at least in part, retrieval of the one or more data elements from the location. The apparatus is further caused to populate an expansion table with at least the retrieved data elements, wherein the expansion table is at least substantially correlated to the set. The apparatus is further caused to perform the information operation on all or a portion of the retrieved data elements in the expansion table.

According to yet another embodiment, an apparatus comprises means for acting on a request to perform an information operation on a set of data elements of an information space. The request identifies the set by a name and the information operation applies to one or more data elements within the set. The apparatus also comprises means for determining a location of the one or more data elements based on the name. The apparatus further comprises means for causing, at least in part, retrieval of the one or more data elements from the location. The apparatus further comprises means for populating an expansion table with at least the retrieved data elements, wherein the expansion table is at least substantially correlated to the set. The apparatus further comprises means for performing the information operation on all or a portion of the retrieved data elements in the expansion table.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing automatic controlled value expansion of information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "information space" or "smart space" refers to an aggregated information set from different sources. This multi-sourcing is very flexible since it accounts and relies on that the observation that the same piece of information can come from different sources. In one embodiment, information within the information space or smart space is represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, the RDF refers to a family of World Wide Web Consortium (W3C) specifications originally designed as a metadata data model. It has come to be used as a general method for conceptual description or modeling of information that is implemented in web resources; using a variety of syntax formats. Although various embodiments are described with respect to information spaces and RDF, it is contemplated that the approach described herein may be used with other structures and conceptual description methods used to create models of information.

Figure 1:
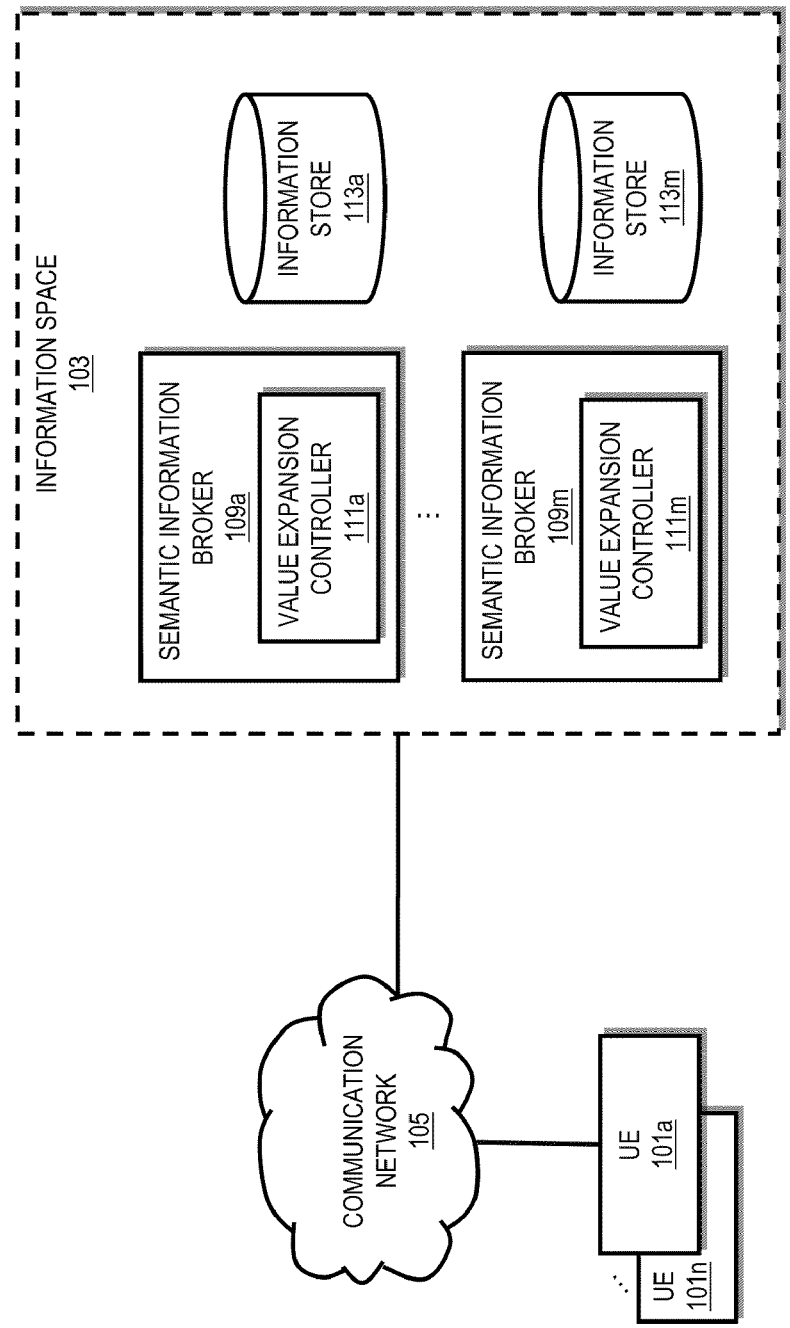
FIG. 1 is a diagram of a system capable of providing automatic controlled value expansion of information, according to one embodiment.

FIG. 1 is a diagram of a system capable of providing automatic controlled value expansion of information, according to one embodiment. As previously described, an information space consists of several distributed devices that communicate information (e.g. RDF graphs) via a shared memory such as a Semantic Information Broker (SIB). A device within an information space environment may store information locally in its own memory space or publish information to the semantic information broker. In the first case, the device is responsible for any process needed for combination or extraction of information, while in the second case the processes can be conducted by the semantic information broker. However, in many cases, the information may be organized as lists or sets of information that can include many data elements (e.g., a contact list, inventory of goods, business directory, etc.). Accordingly, if the device writes information from these sets or lists to the semantic information broker in verbose details (e.g., copies the information in its entirety) as is traditionally done, the volume of information and the bandwidth needed for transferring information between the device and the semantic information broker can be quite considerable. Therefore, significant amounts of network and computing resources may be required. Furthermore, as the number of lists, sets, or groups of lists grows, the resource requirements increase accordingly. The computations and programming for performing information operations (e.g., query, insert, add, remove, delete, extract, etc.) is also tedious and resource intensive, particularly on smaller device such as mobile devices, handsets, etc.

As an example, the semantic information broker may contain a list representing a set of data elements (e.g., list of people), and a device may then want to perform some information operation on the list such as extracting a subset of the information in the list to create a list including only those people who are friends according to the view point of the device or a user associated with the device. The device may have the identifiers of the people on the list in an internal list or use the RDF property mechanism to express the friend relation on the semantic information broker. As another example, a user may want to invite all of his/her friends to an event by creating a relation between each person in a stored list and the event. The user will have to iterate the internal list he/she locally maintains and insert the invitations. This iteration can involve transferring or otherwise manipulating a significant amount information depending on the size of the list.

In another instance, a user may need to find out which one of his/her friends know each other. The user will have to make a two-leveled iteration through the internal list of friends to essentially generate all queries of triple form (friend_1, :knows, friend_2), (friend_1, :knows, friend_3), etc. If the relation is a one way relation (e.g., envies) even more queries are generated because the subject and object of the triple may not be interchangeable. In other words (friend_1, :envies, friend_2) is not an equivalent for (friend_2, :envies, friend_1). As the number of involving relations increases, the amount of iteration rapidly grows. Queries of this kind which require excessive amounts of memory space and processing power can impose high loads on a device and interfere with the normal functionalities of the device. Furthermore, because of the potential for creating multiple interdependent relationships and connections among the multiple sets or lists of information, tracking and enforcing information access and security policies can become quite cumbersome.

To address these problems, a system 100 of FIG. 1 introduces the capability of providing automatic controlled value expansion of information. By way of example, value expansion enables a device to identify one or more sets of data elements on which a query or other information operation is to be performed by a name (e.g., a Universal Resource Identifier (URI)) for each set and to send the names and the requested query or operation to a semantic information broker of an information space. In this way, the system 100 advantageously reduces the amount of bandwidth and computing resources for processing information sets because the system 100 includes means transmitting only the names or other identifiers of the information set rather than the actual data elements of the sets, and then means for expanding the values (or data elements) referenced by the names. In one embodiment, the semantic information broker keeps a syn chronized duplicate of the data elements of the sets so that the semantic information broker can reference local copies of the data elements when perform value expansion. As part of the value expansion process, the semantic information broker applies the received query or operation on the data elements of the sets, and permutations of the elements if necessary, and returns the results to the requesting device. As noted, this process reduces the volume of data exchanged between the device and the semantic information broker because instead of sending a complete set of data elements from the device to the semantic information broker, only the name of the set is being sent. This will result in lower bandwidth usage for data exchange over the communication network. In one embodiment, the value expansion is performed by semantic information broker or another component specifically designated for value expansion and is triggered by predetermined and negotiated family of URIs. In yet another embodiment, the semantic information broker can detect and intercept requests for operations involving value expansion and then transmit the results of the value expansion to the appropriate device or node.

Furthermore, storing multiple copies of the data elements in, for instance, the local storage of the device and in the semantic information broker, advantageously increases data security because the duplicate copies of the data elements can be used as backups with respect to one another. Additionally, an access control mechanism can be assigned to a set or to subsets of a set so that access to value expansions is granted only to authorized entities.

Semantic information brokers as main components of information spaces may be equipped with more powerful processors compared to individual devices (e.g. user equipment). Therefore, application of a query or other operation on data elements of a set by the semantic information broker may take remarkably less processing time compared to the case where the query is processed by the device. This will improve overall efficiency of the whole information space system.

In distributed, ontology based information sharing systems such as information spaces (smart spaces) the information bases are distributed devices that communicate by exchanging information (e.g., RDF graphs) via a shared memory. RDF graphs consist of a set of unique triples of form subject, predicate, object, which allow expressing graphs. The simplest form of an RDF graph is a single triple and an information store may contain several unconnected graphs. RDF is a family of World Wide Web Consortium (W3C) specifications originally designed as a metadata data model. RDF has come to be used as a general method for conceptual description or modeling of information that is implemented in web resources; using a variety of syntax formats. The underlying structure of any expression in RDF is a collection of triples, each consisting of three disjointed sets of nodes including a subject, a predicate and an object. In one embodiment, a subject is an RDF Uniform Resource Identifier (URI) reference (U) or a blank node (B), a predicate is an RDF URI reference (U), and an object is an RDF URI reference (U), a literal (L) or a blank node (B). A set of such triples is called an RDF graph. Table 1 shows sample RDF triples. The information communicated among devices can be free formed RDF triples or governed by an ontology, which describes the properties and relations of classes of information.

TABLE 1

| | RDF structure | |
|---|---|---|
| Subject | Predicate | Object |
| uri://... .../rule#CD-introduction, | rdf:type, | uri://... ... ... .../Rule |
| uri://... .../rule#CD-introduction, | uri://... .../rule#assumption, | "c" |

A knowledge processor is an entity that contains the logic and functionality to establish communication between a device and various information spaces. A knowledge processor generally runs on a single device, even though it may have internal distribution and may initiate information operations on data sets and lists as described herein. Such a device may be a mobile device/phone, personal computer, active sensor, Radio Frequency Identification (RFID) tag, etc. Connectivity is over some network protocol to a semantic information broker. A semantic information broker contains the logic for parsing messages and pointers to subscription handlers between the knowledge processor and the information space. A knowledge processor may potentially connect to more than one information spaces at a time thus distributing and synchronizing the operations across all connected information spaces.

As shown in FIG. 1, the system 100 comprises a user equipment (UE) 101 having connectivity to an information space 103 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi) or other short range networks, satellite, mobile ad-hoc network (MANET), and the like.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

A device 101a-101n of FIG. 1 creates a request including a command to register a name or identifier (e.g., a URI) for a set of data elements in the semantic information broker 109a-109m of the information space 103 and a query or other operation that is to be applied to the set of data elements. After detecting and intercepting the request the semantic information broker 109a-109m registers the name and sends the request to the value expansion controller 111a-111m. The value expansion controller retrieves the data elements correlated to the set with the received name from the information store 113a-113m. Additionally, the value expansion controller analyzes the request and extracts the query or operation that is to be applied on the elements of the retrieved set. The request may include conditions identifying a subset of data elements to be selected and for the query or operation to be applied only on the data elements in the selected subset. In such case, the value expansion controller extracts the subset by applying the condition to the retrieved elements of the set.

A request may include more than one set name, meaning that the query needs to be applied on the data elements of two or more sets. If more than one set names exist in the request, the value expansion controller will generate all permutations of the values and applies the query on all of them. This allows the device to offload potentially heavy computation to the semantic information broker. In one embodiment, the process of value expansion may be delayed or the value expansion requests may be processed in an order different from the order they have been received in, based on the context or due to other conditions and/or priorities. For example, a request by a user may be delayed until a request sent by an administrator is processed because the modifications applied by the administrator are essential for the user request to return a correct result.

Some of the requested value expansions may already exist in the information store 113a-113m from past processes. There can be a negotiation mechanism between the requesting device and the semantic information broker based on which, the semantic information broker may reveal a subset of the existing value expansion to the device. This will be done only if it is allowed by the security restrictions on the existing data. The results of performing the query on data permutations are returned to the device 101a-101n by the semantic information broker.

In one embodiment a value expansion controller 111 may generate new value expansions not triggered by a query or operation from a device but based on its own internal functions including actions related to the access protocol for devices. For example, a user u may request value expansion for all his/her friends x and y who know each other. Assuming that friends(u) is a set containing list of u's friends, the result that u will expect to receive to the request would be values of form (x, y) where $$x \in friends(u) \wedge y \in friends(u) \wedge x \in friends(y) \wedge y \in friends(x)$$

Upon receiving the request the value expansion controller may generate value expansions friends(u) and friends(k) for every k in friends(u).

In other embodiments, a value expansion controller may generate an "undo" expansion upon receiving a deletion request, in order to avoid information loss in cases where deletion request has been sent erroneously. Additionally, the value expansion controller may update one or more counters to keep track of statistics such as the number of queries on certain information, the number of queries by a certain device, etc. Furthermore, the value expansion controller may automatically execute a predetermined sequence of commands after insertion, deletion, updating or querying information in order to produce a new value expansion or update an existing expansion.

In one embodiment, a user may alter the combination of value expansions by adding one or more of information items such as, one or more value expansions generated by the semantic information broker, results of the queries to the semantic information broker, user produced free-form information and user produced formatted information to the configuration.

In another embodiment, the value expansion mechanism can be implemented on the device side, meaning that the value expansion process is triggered by a component within the device and interception is done in the device. However value expansions generated by the device may not be available to any other entity besides the generating device.

In yet another embodiment, the interception is performed by the semantic information broker but the values are stored in the device. This would require the semantic information broker to be able to query the device for required values before generating the value expansion.

In one embodiment, the described approach can be used to provide a lightweight privacy mechanism wherein it is possible to attach policies for example to control visibility of the values of variables (e.g., of the set names). By way of example, the value expansion controller 111 can restrict the expansion of names individually, such that a restricted name is not expanded when referred to by unauthorized entities. Therefore, unauthorized entities (e.g., entities without the corresponding access rights) can be prevented from accessing the actual values of variables. In addition to restricting individual names, the value expansion controller 111 can also restrict access to multiple names based on their naming (e.g., names with a common prefix are restricted, or for names which are URIs, URIs with certain structure are restricted). The policies are easily enforced as the variable expansion is generally performed by the value expansion controller 111 within the semantic information broker 109, and the values may be stored separately from the information graph.

By way of example, the UE 101, semantic information brokers 109 and value expansion controller 111 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
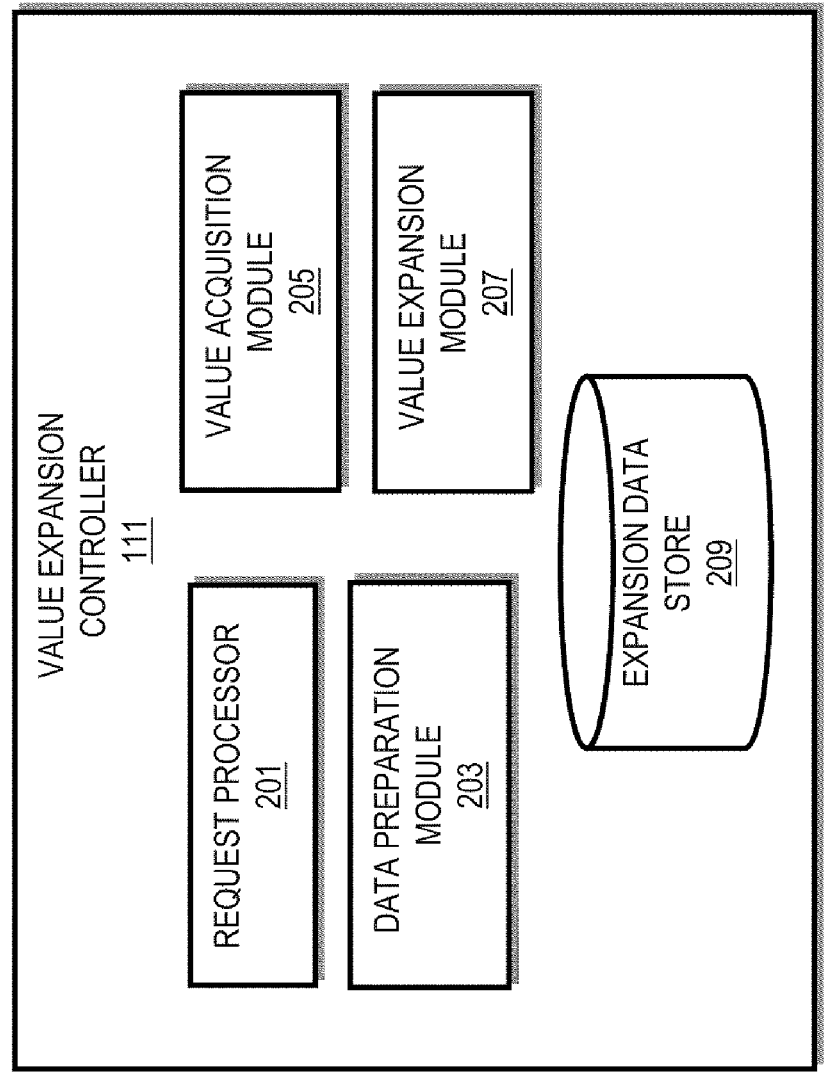
FIG. 2 is a diagram of the components of value expansion controller, according to one embodiment.

FIG. 2 is a diagram of the components of value expansion controller, according to one embodiment. By way of example, the value expansion controller 111 includes one or more components for providing automatic controlled value expansion of information. It is contemplated that the functions of these components may be combined in one or more components or performed by other components of equivalent functionality. In this embodiment, the value expansion controller 111 includes a request processor 201, a data preparation module 203, a value acquisition module 205, a value expansion module 207 and an expansion data store 209.

The value expansion controller 111 receives a request for value expansion from a device or other component of the information space 103 (e.g., SIBs 109a-109m, value expansion controllers 111a-111m). More specifically, the request may originate as an internal request (e.g., from the SIB 109 and/or value expansion controller 111), an external request (e.g., from the UE 101), or a combination thereof. In one embodiment, the request may consist of statements where each statement consists of various components identifying commands and parameters for the statement. The request processor 201 receives the request, extracts the components of every statement of the request and stores a list of the request statements including the extracted components in the expansion data store 209. Table 2 shows an exemplary structure for a statement of a request. The statement of Table 2 consists of, for instance, five components. It is noted, however, that depending on the implementation, the exact types and number of components may vary. As seen in table 2, a statement may include a command for the semantic information broker, identifying the purpose of the request. For instance, if it is the first time that a device is requesting value expansion for a set, the device can register the name of the set at the value expansion controller 111. Value expansion can be then requested for a set that has already been registered. The command identifies whether the request is a registration or a value expansion request.

A statement may also include a subject identifying context of the data elements that the value expansion is applied to. A subject is a set of unique names for data elements so that no two data elements are referred to with the same subject. The subject may also identify the location of the data elements. By way of example, the location of the data elements may be local with respect to the value expansion controller 111 or the SIB 109 (e.g., stored in information store 113) or can be any other component of the network 105 (e.g., the UE 101). Furthermore, a subject may be accompanied by a modifier. Existence of a modifier in the subject prompts the request processor 201 that the statement does not represent a value expansion request but it rather contains instructions for modifications to the expansion variables to be performed before value expansion. For example, the statement subject may include a modifier create which is issued for a value expansion which does not exist and therefore a new entry need to be created for it in the expansion table. An expansion table is the list of expanded values and is stored on the data store 209. Other modifiers include read, update, delete, abolish, etc. New modifiers can be implemented for use in specific cases.

As an example, for value expansion in a namespace concerning statistical data, the modifier average may be added.

A request may contain more than one statement with modifiers. In this case the statements need to be sorted in a certain order for modifications to be applied in a correct order. The data preparation module 203 is responsible for sorting the statements such that for example creates modifiers are always evaluated before any other modifiers and abolish modifiers are always evaluated after all the other modifiers are evaluated. For modifiers such as read, update and delete no specific order is needed. The data preparation module 203 stores the ordered statements in the data store 209.

TABLE 2

Exemplary structure of a request statement

| COMMAND | MODIFIER | SUBJECT | PREDICATE | OBJECT |
|---------|----------|---------|-----------|--------|

The predicate component of a request statement represents the type of expansion. Several expansion types may exist. For example, basic expansion is when the subject is expanded into a list of names. In addition, an expansion may be a limited expansion, meaning that the subject may be expanded up to a predefined number of items, or no more than a predefined number of values may be given for a subject. In another expansion type, the values may be obtained piecewise in chunks of a predefined size. A one-shot expansion is a type of expansion where the expanded data elements are deleted after being read. In some other scenarios, a statistical function or other functions are applied on data elements during value expansion. For example a correlation for all odd and even values associated with the name may be calculated and returned as the expansion.

The value acquisition module 205 locates and retrieves data element values by using the subject of the request statement. The value expansion module 207 calculates the expansion by applying the predicate on the data acquired by the value expansion acquisition module 205 utilizing the conditions introduced by the object component of the request statement. Furthermore, rules may be applied so that the value expansion module 207 honor modifiers only if the subject belongs to a certain predetermined namespace. The value expansion module stores the calculated value expansion in the expansion data store 209.

In one embodiment value expansions can be used as a side backup of the device state by the semantic information broker. A device that gets disconnected from the network and joins the network again can rebuild its current state based on the value expansions.

In another embodiment, conditions can be set forth such that different devices connected to the network can have different access authority to value expansions. For instance, a device may be allowed to only access the variable names while another device may be able to access either names or values.

The names and associated values for data elements are stored in the expansion data store 209 as, for instance, one or more expansion tables. The expansion data store 209 may consist of one or more logically separate storage areas classified by their subjects. The storage areas may be placed under access control, which effectively implements policy mechanism for trusted information.

In one embodiment, the logical separation of the expansion data store 209 can be implemented such that the expansions are not stored at the semantic information broker side, but at the device. This will allows keeping information physically separate from the semantic information broker.

Figure 3:
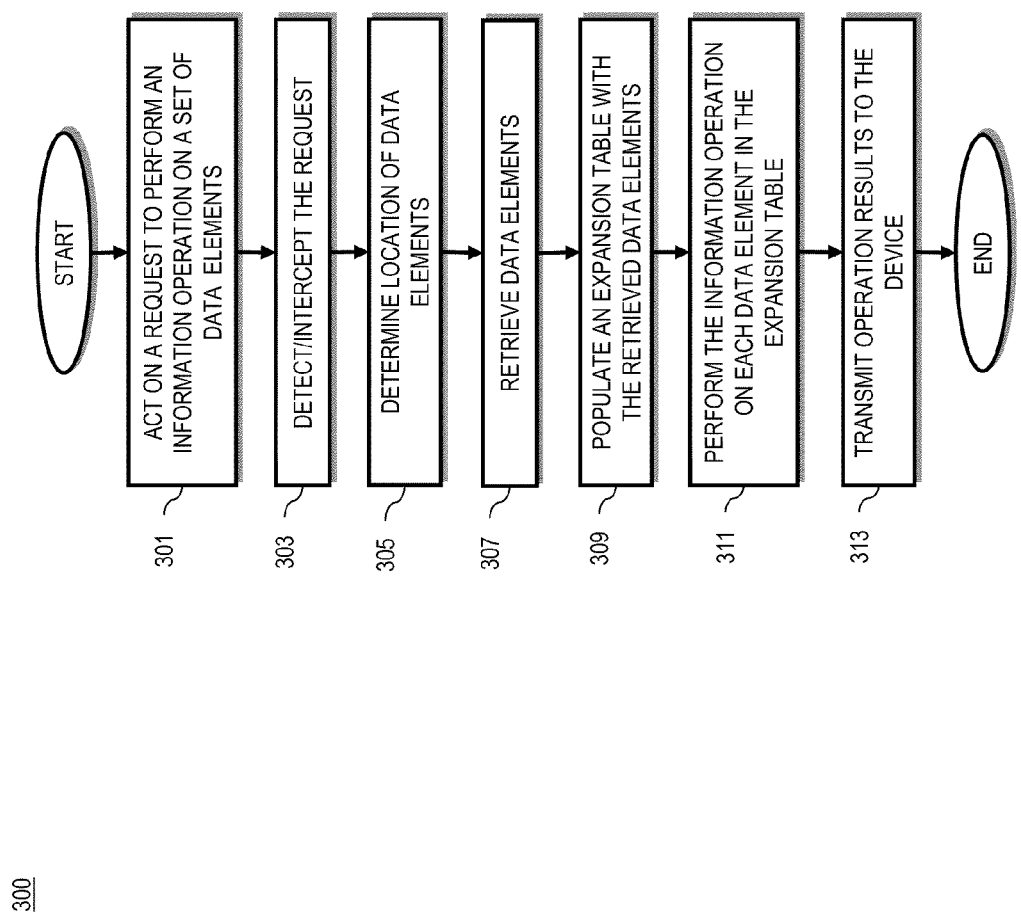
FIG. 3 is a flowchart of a process for providing automatic controlled value expansion of information, according to one embodiment.

FIG. 3 is a flowchart of a process for providing automatic controlled value expansion of information, according to one embodiment. In one embodiment, the value expansion controller 111 of FIG. 2 performs the process 300 and is implemented in, for instance, a chip set including a processor and a memory as shown FIG. 11. In step 301, the value expansion controller 111 acts on a request to perform an information operation on a set of data elements of an information space. The request, for instance, identifies the set by a name that can be used to locate the data set for value expansion. In one embodiment, the value expansion controller 113 first detects the request for data expansion at a device. The device may send the request directly to the value expansion controller, send a signal to inform the value expansion controller of the request, or store the request in a location where both the device and the value expansion controller 111 have access to and set a flag indicating that a new request has been received. Upon being informed about the request, the value expansion controller 111 detects and/or intercepts the request as per step 303. As noted previously, it is contemplated that the request may be an internal request, external request, or a combination thereof. The request may also specify more than one data sets. The value expansion controller 111 may create a local copy of the request at the expansion data store 209 and use it as a reference for value expansion. In step 305, the value expansion controller 111 determines the location of data elements by analyzing the request. The value expansion controller 111 analyzes the request through a process described above in FIG. 2 and stores the results in the expansion data store 209. In step 307, the value expansion controller 111 retrieves the data elements by accessing the locations determined in step 305 and stores the data in expansion data store 209. In step 309, the data expansion controller populates an expansion table with the retrieved data.

In step 311, the data expansion controller applies the conditions defined in the request, modifier or predicate of Table 2. If the request includes a modifier (e.g. create), the data is not expanded. Instead, the data expansion controller 111 modifies the expansion variables in the expansion store accordingly. For example, if the request includes a create indicator issued for an expansion that does not exist, the data expansion controller can create a new entry in the expansion table. Furthermore, the data expansion controller may honor the create indicator only for requests involving certain predetermined namespace. In step 313, the data expansion controller 111 transmits the results to the requesting device.

Figure 4:
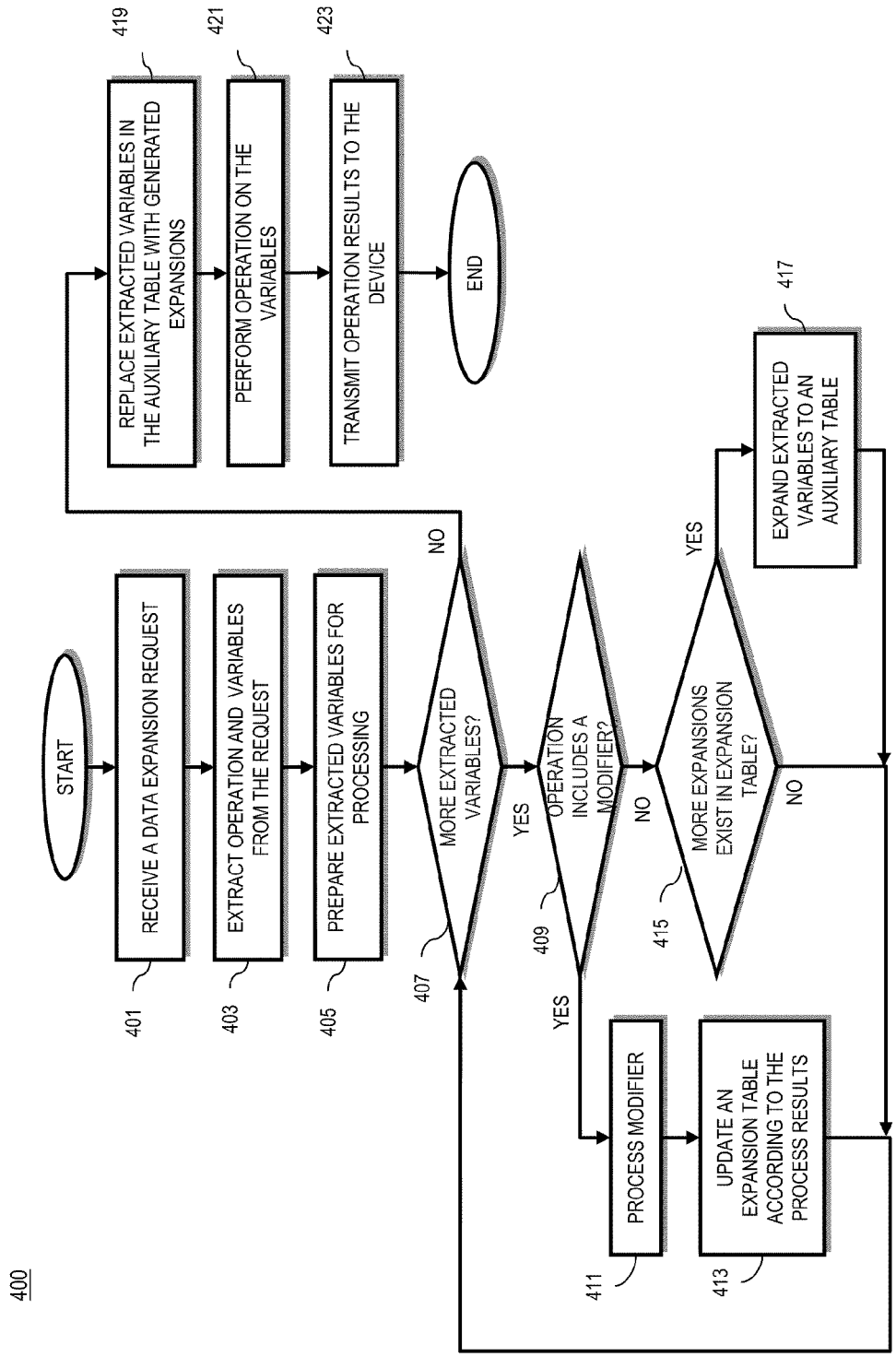
FIG. 4 is a flowchart of processing a request for automatic controlled value expansion of information, according to one embodiment.

FIG. 4 is a flowchart of a process for processing a request for automatic controlled value expansion of information, according to one embodiment. In step 401, the value expansion controller 111 receives and then acts on a request from either an external device (e.g., the UE 101) or an internal component (e.g., the SIB 109). In step 403, the data preparation module 203 extracts parameters required for request processing as seen in Table 2, from the received request. Since a request can consist of one or more statements, Table 2 may consist of one or more rows of parameters one row for each statement. In such case, the data preparation module 203 sorts statements according to the order that they should be processed (create first, abolish last and other modifiers in between) per step 405. Table 3 shows the process corresponding to each of the modifiers. In step 407, the value expansion controller 111 checks whether all the statements of the request have been processed.

TABLE 3

Modifiers

| MODIFIER | PROCESS |
| --- | --- |
| Create | Add an entry for a variable to expansion table after checking credentials |
| Abolish | Remove an entry for a variable from expansion table after checking credentials |
| Update | Add the OBJECT of an RDF triple to the content of entry for the specified variable in the expansion table |
| Delete | Remove OBJECT of an RDF triple from the content of entry for the specified variable in the expansion table |
| Read | Find variables from RDF triples (SUBJECT, PREDICATE, OBJECT), expand found variables into an auxiliary table and replace any triple with variables in the expansion table with the triples containing the values in the expansion. |

If unprocessed statements exist, per step 409, the value expansion controller 111 checks whether the next statement includes a modifier such as read, create, abolish, delete or update. If a modifier is found, it is processed as per step 411. As seen in Table 3, the read modifiers may store the intermediate results of modifications in an auxiliary table so that further modifications can be applied on the results before they are ready to be written in the expansion table. All of the modifiers deal with an expansion table whose structure is shown in Table 4. The modification results are written in the expansion table 4 per step 413.

In case of create modifier the data expansion controller 111 may verify credentials of the requesting device. If the credentials are not approved, the device access to the expansion is denied.

If evaluation of step 409 indicates that there is no modifier in the statement, the value expansion controller 111 checks for expansions in the expansion table per step 415. If no expansions are found, the process will return to step 407 for next statement to be processed. However, if expansions are found in the expansion table, their values are stored in an auxiliary table which consists of expansions pertaining to the current request. The process then returns to step 407 for next statement to be processed.

The set of processes between steps 407 to 417 are repeated until all statements of the request are processed. When no more statements are left, step 407 will lead to step 419 where the full set of possible combinations for the values of the expansions is generated. The process of generating value expansions may be performed using Augmented Binary Decision Diagrams (AugBDD) (FIG. 5) or based on data signatures. In step 421, the operation identified by PREDICATE in table 2 is performed on all the value combinations generated for SUBJECT and OBJECT. In step 423 the calculated results is transmitted to the requesting device.

If a set name (e.g., a URI) is postfixed with a modifier, no value expansion is performed; instead the variable store is modified according to the modifier. A special case is when a URI or name contains create modifier which is issued for an expansion that does not yet exist. In this case a new entry is created in the expansion table. Furthermore, the create modifier may only be considered if the URI or name belongs to certain predetermined namespace (for instance val://m3.org/e/). Other modifiers such as read, update, delete and abolish exist, but new modifiers can be implemented.

TABLE 4

Expansion Table

| EXPANSION NAME | CREDENTIALS | EXPANSIONS |
|---|---|---|
| val://m3.org/e/a123 | 0xad43 | "John", "Mary", ... |
| val://m3.org/e/a123#friends, | 0x3214 | "Jen", "David", "Fred" |
| ... | ... | ... |

In one embodiment, several information triples may contain modifiers. In such cases, the data preparation module 203 sorts the triple such that create modifiers are always evaluated first and abolish modifiers are always evaluated last. For other modifiers, no specific order is specified. The requesting device may order the modifiers by transmitting them separately. The following example includes three requests involving an insert command for creating the value expansion val://m3.org/e#a123:

| | |
|---|---|
| ins(val://m3.org/e/a123#create, m3:val, sib:any) | # creates the expansion |
| ins(val://m3.org/e/a123#update, m3:val, "Matti") | # insert value "Matti" |
| ins(val://m3.org/e/a123#update, m3:val, "Maija") | # insert value "Maija" |

At this point the expansion val://m3.org/e#a123 with values "Matti" and "Maija" is created. This expansion can be now used in a request using a query command:

Query(sib:any, foaf:name, val://m3.org/e#a123)

Based on the definition of the expansion val://m3.org/e#a123, the above query can be expanded to:

Query(sib:any, foaf:name, "Matti")

Query(sib:any, foaf:name, "Maija")

where expanded values replace the expansion namespace. The following insert command removes value "Maija" from the expansion val://m3.org/e#a123 by using modifier delete:

ins(val://m3.org/e/a123#delete, m3:val, "Maija")

The read modifier can be used as:

ins(val://m3.org/e/a123#read, m3:val, sib:any)

The above command returns the values in insert confirmation. This may be considered as slightly redundant with query mechanism, however by using this command only single values are returned instead of triples. The following command removes a value expansion:

ins(val://m3.org/e/a123#abolish, m3:val, sib:any)

After a value expansion is removed, any query about the removed expansion such as:

Query(sib:any, foaf:name, val://m3.org/e#a123)

will return no answers, because the URI does not exist anymore.

It is noted that the predicate in triples from above examples may be modified and new conditions are added to them. For example, the predicate m3:val may be replaced with predicate m3:tripleval, or for create modifier credentials may be added to the predicate which act as access control or policy mechanisms.

Figures 5A, 5B:
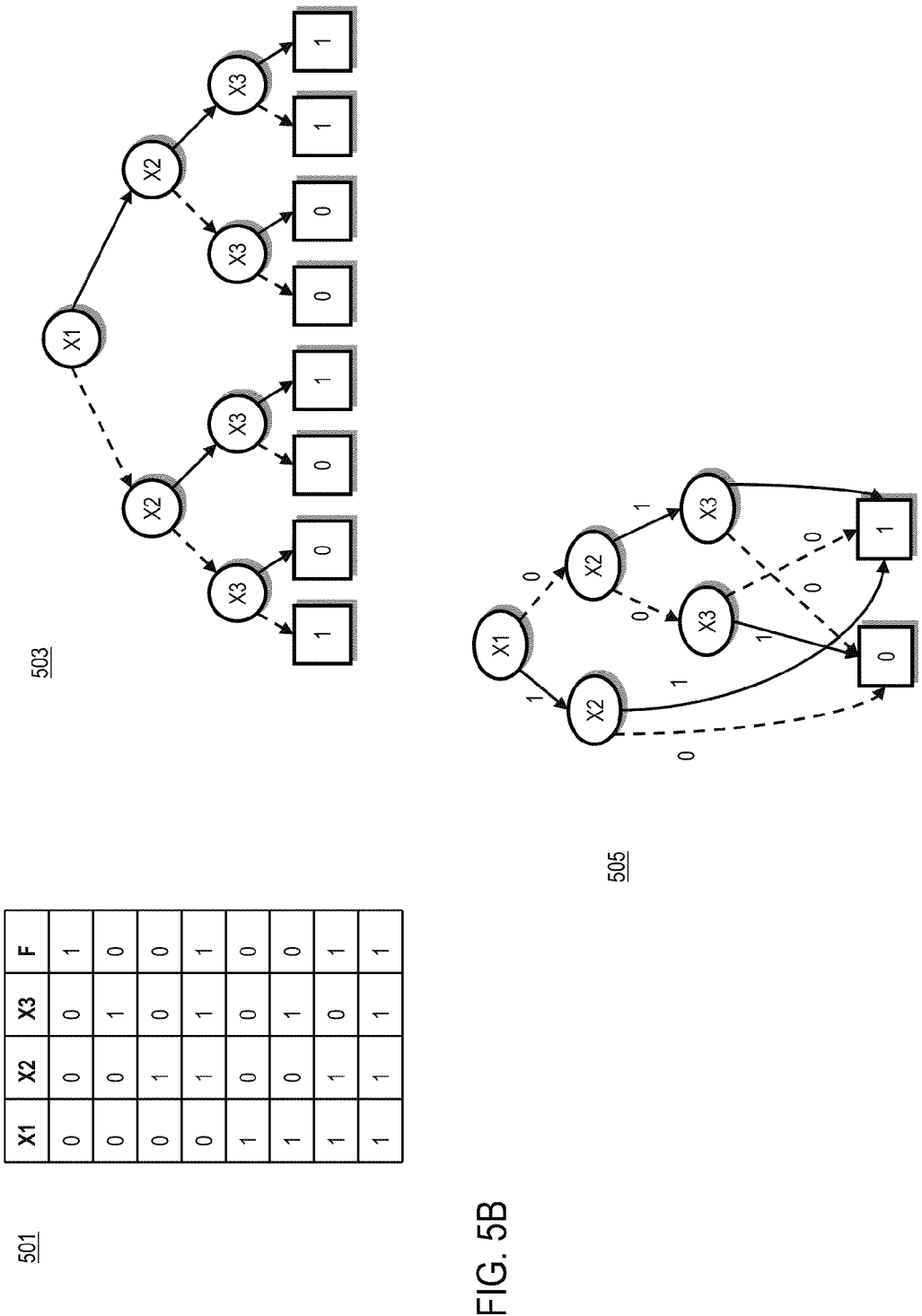
FIG. 5A is a diagram of a binary decision diagram, according to one embodiment.
FIG. 5B is a diagram of a reduced ordered binary decision diagram, according to one embodiment.

FIG. 5A is a diagram of a binary decision diagram, according to one embodiment. A binary decision diagram (BDD) is essentially a group of Boolean variables in a specific order and a directed acyclic graph over the variables. A depth-first search of the graph yields all possible values of the set described by the BDD. As seen in FIG. 5A, table 501 shows values of a function F based on the values of variables x1, x2 and x3, assuming that various combination of one bit variables x1, x2 and x3 produces F as an answer to a query. The diagram 503 in FIG. 5A is the binary decision diagram for table 501. The function F in FIG. 5A can be represented as:

$$(\neg x_1 \wedge \neg x_2 \wedge \neg x_3) \vee (\neg x_1 \wedge x_2 \wedge x_3) \vee (x_1 \wedge x_2 \wedge \neg x_3) \vee (x_1 \wedge x_2 \wedge x_3)$$

FIG. 5B is a diagram of a reduced ordered binary decision diagram, according to one embodiment. The step 419 of FIG. 4 can be performed using a reduced ordered binary decision diagram (ROBDD) or AugBDD. For example, a BDD 505 constructed for given information is unique for a chosen variable order. A ROBDD independently constructed with the same variable order for the same information is always the same over the semantic web or the information space.

ROBDDs represent a set of bits or a relation and they can be constructed from a binary decision tree (representing a set of bits) by means of reduction rules. The constructed BDD is canonical for the set of bits it represents and for the order of its variables. A Reduced Ordered Binary Decision Diagram (BDD in short) is an efficient representation for a set.

The basic logical operations AND($\wedge$), "OR($\wedge$), NOT ($\neg$), Equivalence(=), Existential ($\exists$), and Universal($\forall$) abstractions are defined for BDDs. Therefore, it is possible to construct a new BDD by means of logical operations over BDD(s). From a constructed BDD a possible solution to the logical formula the BDD represents can be drawn by traversing the BDD graph. This can be done in polynomial time (with respect to the number of variables or bits). Also, the order of variables will affect the size of the constructed BDD and there are known pathological cases of sets whose BDD representations are always large. However, in practice BDDs have proven to be a very efficient way of encoding and operating on large sets.

Reduced ordered binary decision diagrams (ROBDD) are used as the basis for the consistency verification technology. Various ways may be used to convert an information graph (e.g., RDF graph) into the representation of, for example, a BDD or an ROBDD. General BDD encoding is based on creating a triple (a, b, c) in which pieces of information "a," "b," and "c" are represented using three bits per each piece of information. This encoding scheme results in a triple represented, for instance, as (101, 001, 011), that is in turn maintained in a dictionary, e.g., as (a=101, b=001, c=011). BDD encoding can be accomplished by performing logical "OR" ($\vee$) operations with each bit sequence associated with a query result. For instance, the BDD representing triple (a, b, c) (BDD1) gets the following variable assignment for the nine bit variables V1 to V9:

$$BDD_1 = V_1 \wedge \neg V_2 \wedge V_3 \wedge \neg V_4 \wedge \neg V_5 \bigcirc V_6 \wedge \neg V_7 \wedge V_8 \wedge V_9$$

Each variable is a bit. The satisfying variable assignment to this BDD is precisely the encoding of the above-mentioned triple.

Another triple (b, a, c) or (001,101,011) can also be represented by a BDD (BDD2) by same means as above;

$$BDD_2 = \neg V_1 \wedge \neg V_2 \wedge V_3 \wedge V_4 \wedge \neg V_5 \wedge V_6 \wedge \neg V_7 \wedge V_8 \wedge V_9$$

Now it is possible to combine the two BDDs to form a new BDD as follows:

$$BDD_{NEW} = BDD_1 \vee BDD_2 \quad (1)$$

This can be repeated for all triples in an answer to a query and the resulting BDD will contain all unique triples.

Figures 6A, 6B:
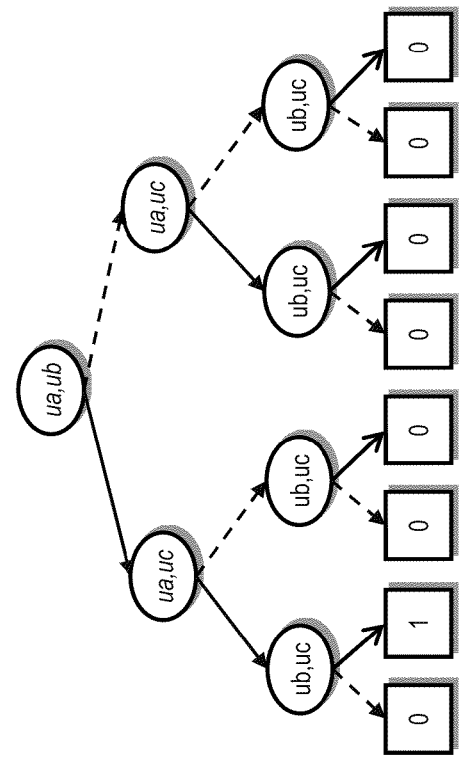
FIGS. 6A and 6B are diagrams illustrating generation of data expansion tables using binary decision diagrams, according to one embodiment.

FIGS. 6A and 6B are diagrams illustrating generation of data expansion tables using binary decision diagrams, according to one embodiment. For efficient generation of expansion table, the set of mappings between names and values can be implemented using an AugBDD and BDD operations for efficient combination of data elements. An AugBDD ID can correspond to a value expansion. The items in AugBDD history may be expansions themselves. The expansion table 601 from FIG. 6A represents a friendship relation between 8 users $u_1$ to $u_8$. As seen in table 601 for every sets $u_a$ and $u_b$ the binary digit in the cell of table 601 corresponding to $u_a$ and $u_b$ shows the friendship between the pair where 1 means $u_a$ and $u_b$ are friends and 0 means $u_a$ and $u_b$ are not friends.

Binary Decision Diagrams can be used in order to construct an expansion table to find an answer to the request for: "which two friends of u1 know each other?". The request is represented by the following logical formula:

$$(u_a, u_b) \wedge (u_a, u_c) \wedge (u_b, u_c) \quad (2)$$

Table 603 in FIG. 6A illustrates the answer to the request for the example of table 601.

In order to create the expansion table 603 using BDDs, for every three users $u_a$, $u_b$ and $u_c$ (where $1 \leq a, b, c \leq 8$) the BDD 605 of FIG. 6B can be created. As seen in BDD 605, for every $u_a$, $u_b$ and $u_c$ the value of the table will be one only if all 3 components of formula (2) are true (their value is 1).

In another embodiment, the mapping between names and values in a value expansion table can be done using data signatures. An added benefit of this approach is that encrypted information can be mapped as well as unencrypted information.

Using data signatures, data may be identified that is relevant to a set of one or more queries. The location of the relevant data and/or the identification of the information sources (e.g., information stores) storing the relevant data, within, for example, network or a memory device, may also be determined. Based on the identification of the information sources that hold relevant information or data, an information source vector can be generated. The information source vector may, as a result, indicate where relevant data to the set of queries may be found. The information source vector may also be verified by determining whether an equivalence class representation of the information vector can be generated. The information source vector may then be used to generate a cyclotomic polynomial. The cyclotomic polynomial may then be factored to generate a plurality of orthogonal data signatures. By generating the data signatures in this manner, two or more data signatures of the plurality of data signatures may be combined to reconstruct the cyclotomic polynomial and, accordingly, the original data used to generate the cyclotomic polynomial. In some example embodiments, dispersion of the data signatures to information stores of a dynamic distributed device environment can be advantageous since data loss may be decreased by the combination properties associated with the data signatures.

Logical separation of value expansions can be implemented in several ways. In one extreme the table containing the expansion names and values may be an internal table. This is an efficient approach for the case where expansions are implemented using Augmented Binary Decision Diagrams (AugBDD). In other extreme it is possible to keep both the value names and the actual values on the information store 113 where other information is stored. This means that for each request the semantic information broker 109 would have to be queried to check whether the expansion exists.

A middle ground is that the names from expansion table are replicated (partly, if needed for access control or security reasons) on the information store 113. This allows querying the expansion names in the access protocol level, which may be useful for negotiation. In this case, the negotiating device will not be able to access the data values until its authority is approved. Table 4 is a logical view of the expansion table with names, values and access control as credentials.

An implementation alternative is to utilize the value expansion as part of the information space architecture. It is noted that the consistency checking can be available in arbitrary locations in the functional architecture. A knowledge processor may send its constraints to the semantic information broker and the semantic information broker may send its constraints to the knowledge processor or to other semantic information brokers.

For example, the device may create an insert command where the subject is a URI with predetermined prefix and a predetermined modifier name to register a name and a similar mechanism to associate RDF values (URIs or literals) to them. The basic modifiers are create, update, delete, read and abolish. However, particular modifiers required by certain types of URI may be added.

In one embodiment, the create modifier can be used as a login mechanism for access control to a single expansion URI. After a URI name is registered, every access protocol message is scanned for that particular URI. If the registered URI is found, the semantic information broker expands it so that a new instance of the particular access protocol message is generated for each value associated with the URI. If more than one such URI is in the message, the semantic information broker will generate all permutations of the values. This allows the device to offload potentially heavy computation to the semantic information broker while expressing it in a fairly concise way.

In one embodiment there can be a negotiation mechanism, during which the semantic information broker reveals a subset of the existing value expansion URIs which are present in the semantic information broker or in other devices.

Figure 7A:
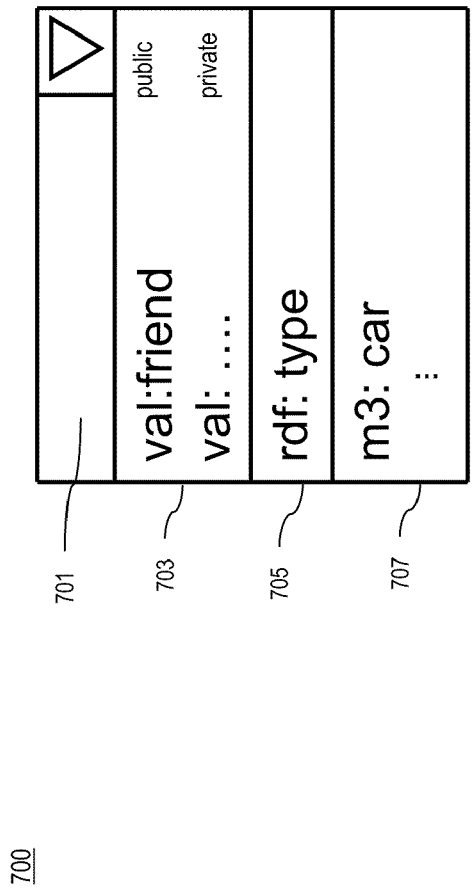
FIGS. 7A and 7B are diagrams of user interface elements, according to one embodiment.
Figure 7B:
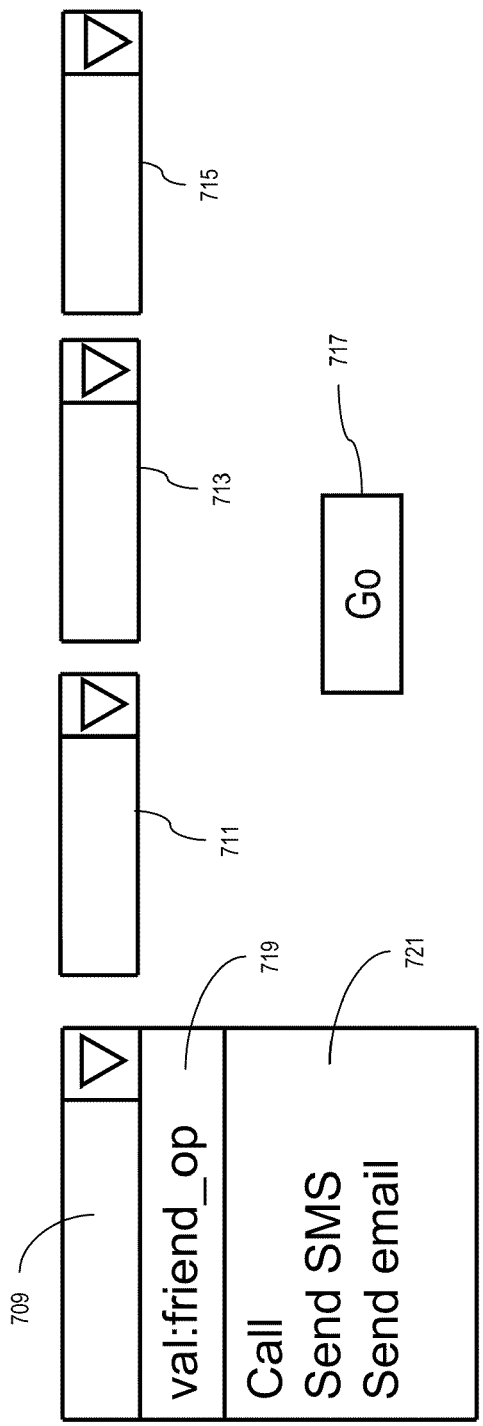

FIGS. 7A and 7B are diagrams of user interface elements, according to one embodiment. The value expansion process may be performed in the semantic information broker interface for all requests (i.e. access protocol messages).

The user interface can be implemented in many different ways. FIGS. 7A and 7B show a simple implementation using RDF graphs as an example. As seen in FIG. 7A, in this implementation the user interface elements are a set of simple text boxes 701 augmented with a drop down list. For instance, user can choose options by pointing at a touch screen. Diagram 700 of FIG. 7A shows a single user interface element. The dropdown box of diagram 700 contains the available value expansion names 703, which may have an access control status (e.g., public, private). The dropdown list may also contain other RDF URIs which may be originating from semantic information broker or the user's own device. Boxes 705 and 707 show some sample URIs that are part of the dropdown list. The user may input free form text to the text field 701 or select a value from the dropdown list.

These elements can be aggregated to form a combination. For RDF configuration a configuration of three boxes (e.g., boxes 707a-707n) as the subject, the predicate and the object is required, however there is no limit on the number of elements that. For example, five boxes (e.g., boxes 707a-707n) may correspond to path of two arcs and three nodes in RDF graph. One way of clustering a group of boxes is to group them in sets of three where the groups can be combined with different operations (e.g. logical operations AND, OR, etc.).

FIG. 7B shows a configuration of three elements 711, 713 and 715 along with an operation selector 709. The user may initiate an expansion by pressing button 717; however certain types of operations are initiated when a combination is found. In one embodiment, the semantic information broker may generate a value expansion which contains possible operations pertaining to a named expansion or the combination of the expansions 719.

From a user's perspective, the controlled value expansion manifests itself as a configuration of user interface elements. As seen in FIG. 7B, the user may select one or more of these interface elements and perform an operation 712 (including messaging, email, call, add to social network, etc.). It is possible to alter the combinations by various means such as adding to the configuration expansions generated by the semantic information broker which pertain to a certain named expansion or to combination of multiple expansions, adding to the configuration URIs which are result of querying the semantic information broker, adding to the configuration user produced free-form information, or adding to the configuration user produced URIs.

In one embodiment, the basic implementation is performed at the access protocol access point such that triples in each message are scanned for the predetermined (or negotiated) URIs, which may reside in a table. Upon collecting the expansions, the value expansion module 207 expands all of the values and their combinations and for each combination performs the access protocol command contained in the expansions. If the expansions are represented as AugBDDs, the generation of the combinations can be effectively performed by means of the BDD OR operation over the AugBDDs of the expansions.

By way of example, irreducible polynomial expressions or data signatures can be obtained through the transformation or synthesis of partial data closures, using cyclotomic polynomial extensions. The partial data closures may be local to a device, such as a device within a dynamic distributed device network, and can be generated based on a received set of one or more queries. The data signatures represent smaller sized data packages, compared to partial data closures that may be used to reproduce a full or deductive data closure through a process of combination and transformation. The data signatures may be dispersed within an information space using a dispersion technique such as a uniform or skewed/non-uniform dispersion technique. Due to changes in a dynamic distributed device network and/or associated changes to data within the network, data signatures may be regularly or irregularly re-synthesized or updated to ensure that the data signatures accurately represent the data upon which the data signatures are based. The data signatures may be subsequently stored to facilitate use of the data signatures with respect to later queries. If the values are signatures the same can be achieved by unfolding the signature.

A straightforward extension of expansion of nodes to expansion of triples can be made. A distinct class of URIs can be defined that trigger expansion to triples and allow inserting values to the collections. This allows identification of subgraphs. Triple expansions can be implemented so that each expansion name has specific subject, predicate, object postfixes in the expansion URI such as: ins(val://m3.org/e/sib_activity/a123/s#update,m3:val,:Matti). In such cases where there are references to the expansion name without subject, predicate, object selectors, the triple can be produced automatically during the expansion.

Figure 8:
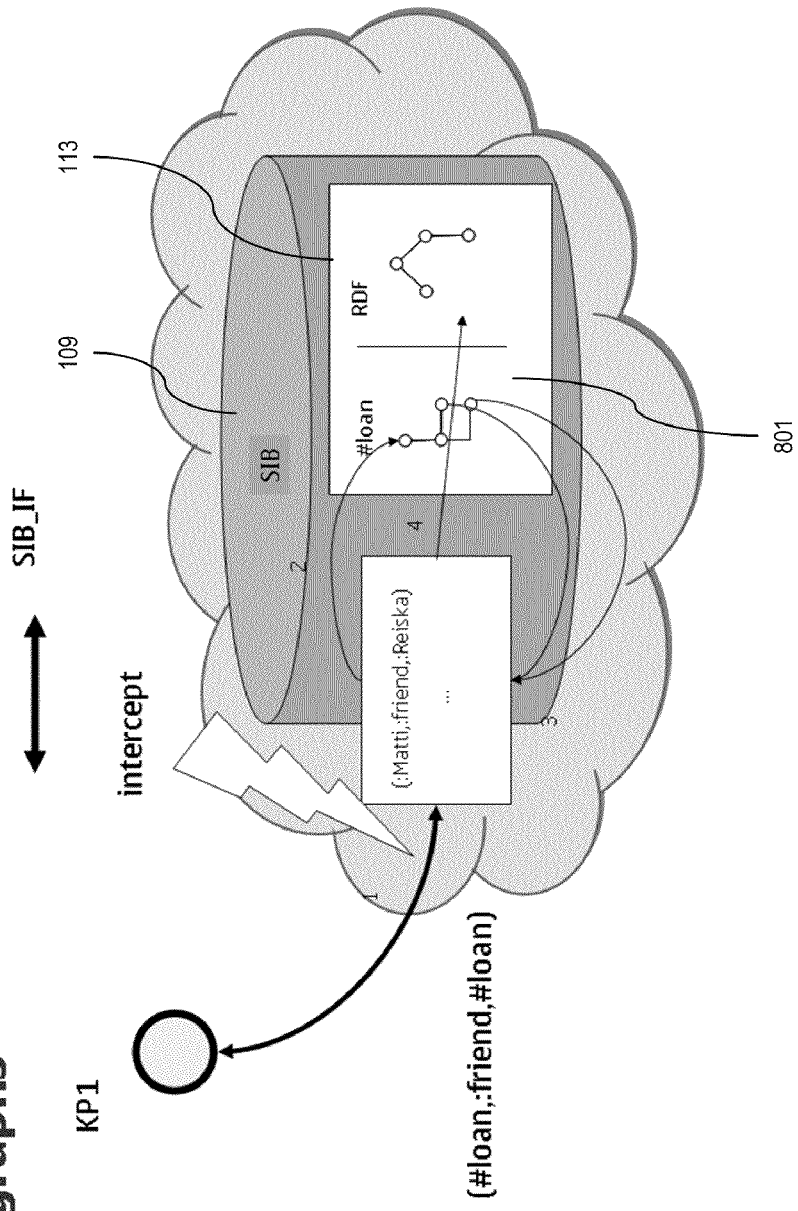
FIG. 8 is a diagram of an expansion table implemented in the semantic information broker, according to one embodiment.

FIG. 8 is a diagram of an expansion table implemented in the semantic information broker, according to one embodiment. As seen in FIG. 8 the expansion table 801 is entirely implemented in the information store 113 of the semantic information broker 109. In this case, the knowledge processor KP1 creates a request for value expansion (Matti, :friend, :reiska) in the information store 113. The request is intercepted by the semantic information broker 109 and per step (2) the semantic information broker start generating the expansion table and expanding values requested by KP1. The semantic information broker stores the generated expansion in the expansion table 801. In step (3) the semantic information broker provides one or more expanded values to the requesting KP1. In step (4) the information graph in the information store 113 is modified according to the recent value expansion. In this example, since the variable names and the extension table values all reside on the semantic information broker, the expansion process can be entirely implemented in the semantic information broker.

Figure 9:
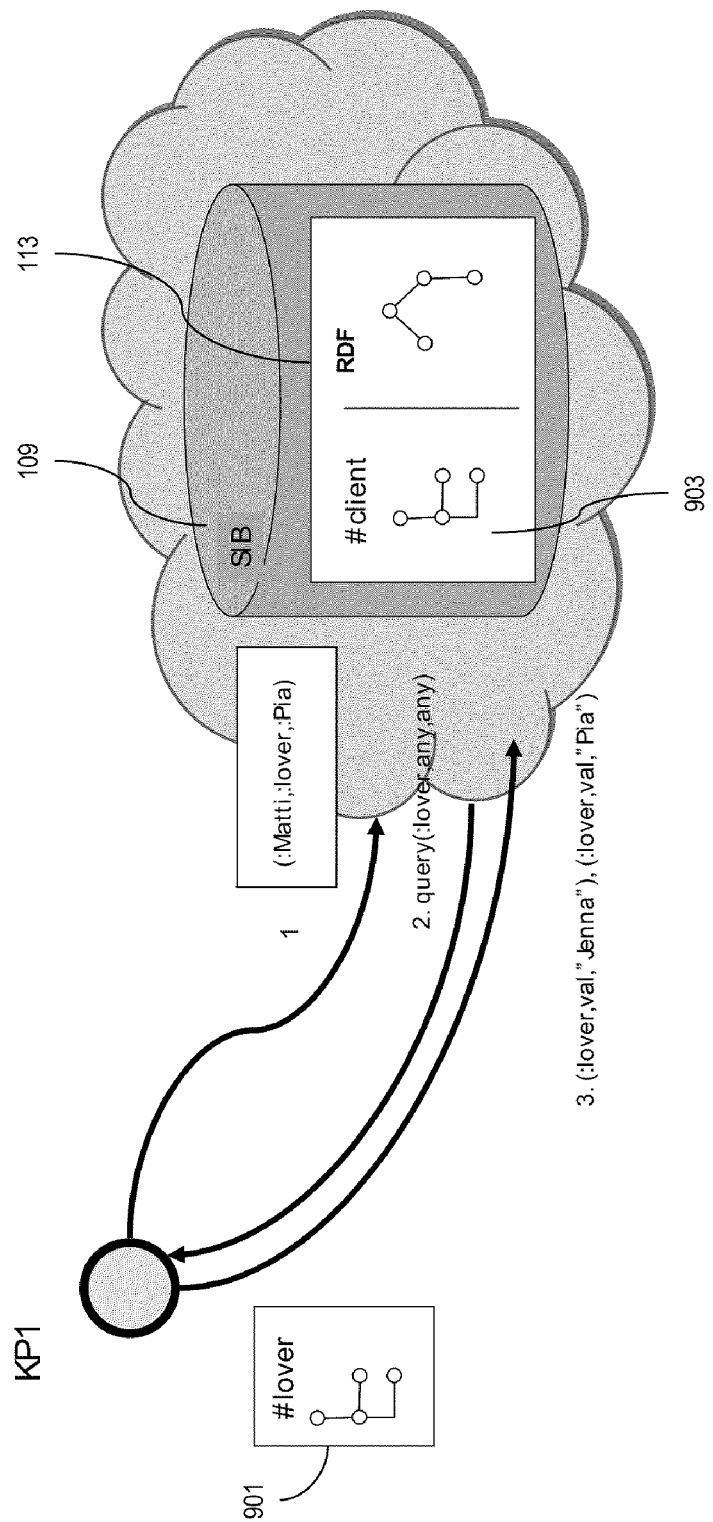
FIG. 9 is a diagram of an expansion table implemented partly in the device and partly in the semantic information broker, according to one embodiment.

FIG. 9 is a diagram of an expansion table implemented partly in the device and partly in the semantic information broker, according to one embodiment. As seen in FIG. 9, the component 901 of expansion table named Mover is implemented in the device side where the knowledge processor also resides while the component 903 of the expansion table named #client resides in the information store 113 of the semantic information broker 109. In such cases, the semantic information broker 109 needs to have a way of accessing or retrieving values from device side. In one embodiment, this feature is implemented by an extension to the access protocol which is essentially a "reverse query" and "reverse subscription". The reverse query mirrors the access protocol query and subscribe, but in this case it is the device that answers the query. As seen in FIG. 9 in step (1) the knowledge processor queries the semantic information broker with a triple (:Matti, :lover, :Pia). However since the Mover table 901 resides on the device side, per step (2) the semantic information broker queries the device with the reverse query: query(lover, any, any). This reverse query returns the values from Mover table to the semantic information broker per step (3). The semantic information broker still has the names of the expansion names and whenever the values are needed the semantic information broker queries the device for them.

The processes described herein for providing automatic controlled value expansion of information may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
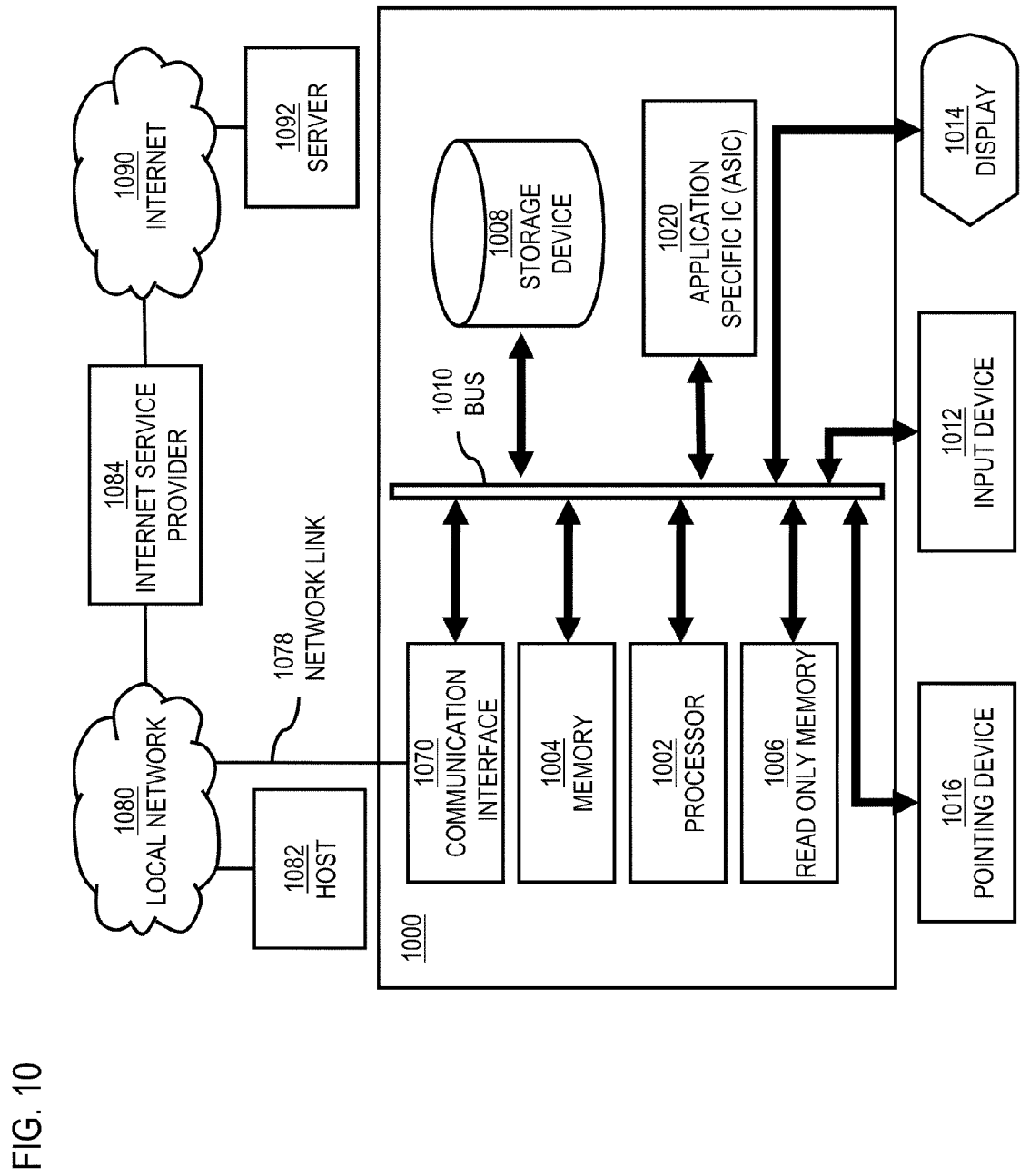
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to automatically control value expansion of information as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of providing automatic controlled value expansion of information.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to providing automatic controlled value expansion of information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for providing automatic controlled value expansion of information. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing automatic controlled value expansion of information, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 105 for providing automatic controlled value expansion of information to the UE 101.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

Figure 11:
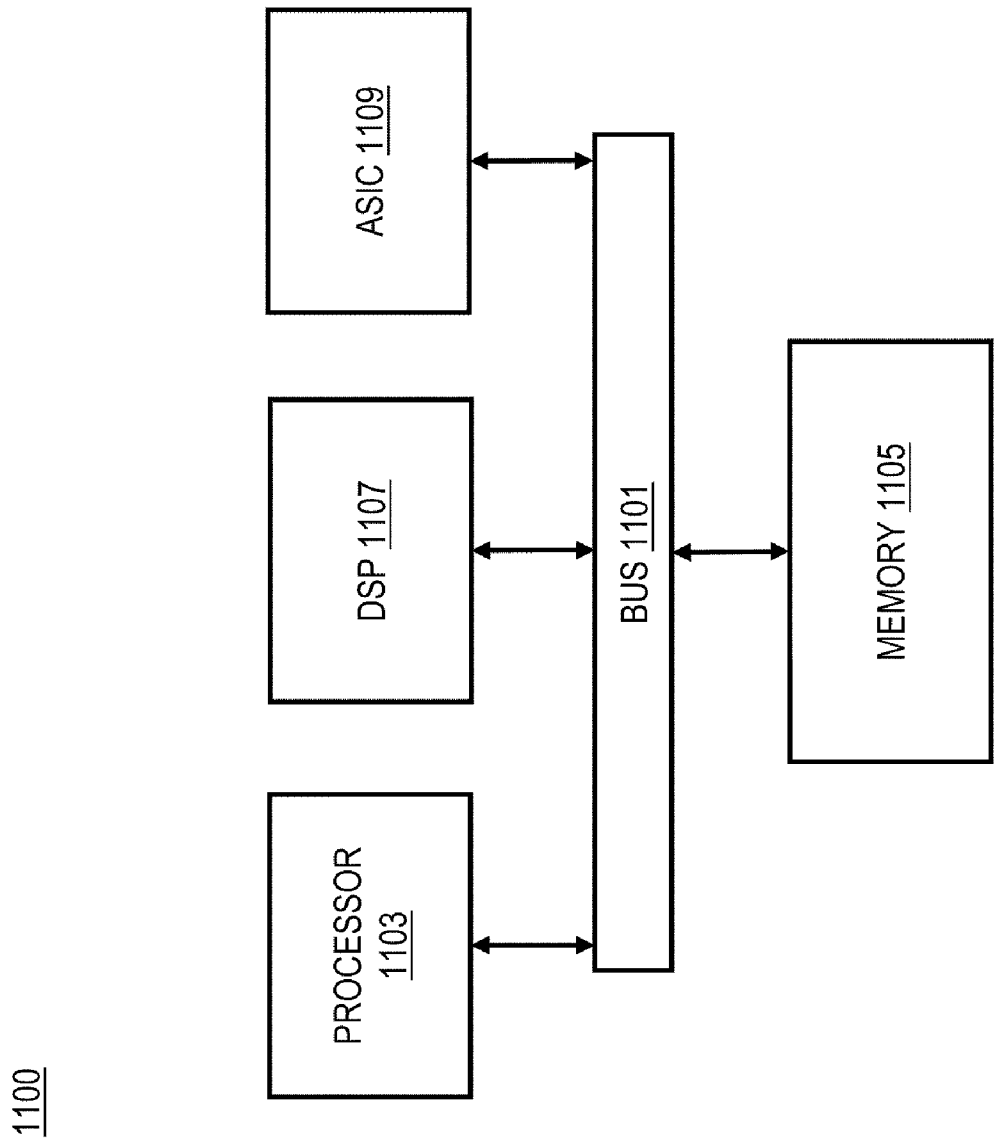
FIG. 11 is a diagram of a chip set that can be used to implement an embodiment of the invention.

FIG. 11 illustrates a chip set 1100 upon which an embodiment of the invention may be implemented. Chip set 1100 is programmed to automatically and controlled value expansion of information as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1100, or a portion thereof, constitutes a means for performing one or more steps of providing automatic controlled value expansion of information.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide automatic controlled value expansion of information. The memory 1105 also stores the data associated with or generated by the execution of the inventive steps.

Figure 12:
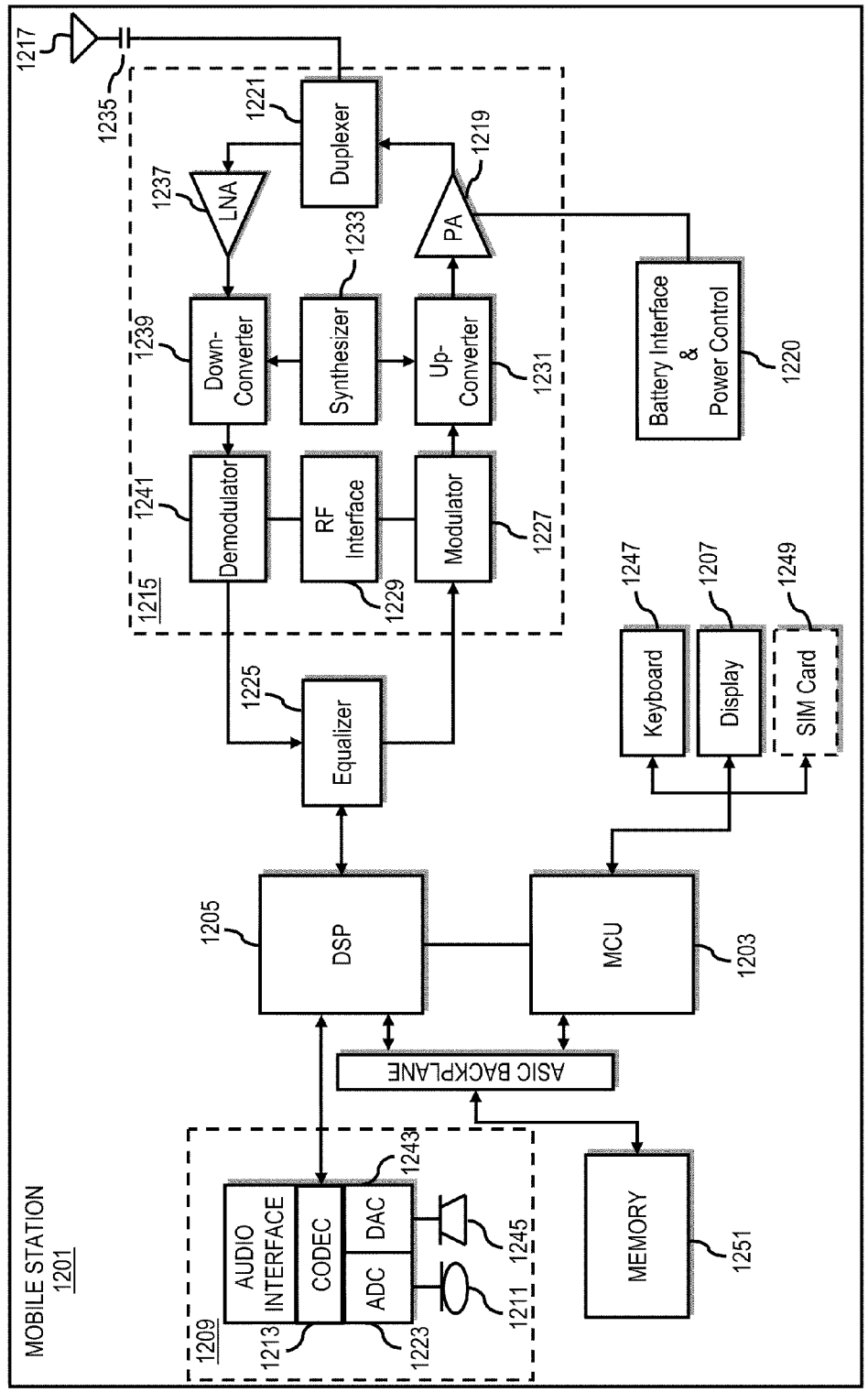
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1200, or a portion thereof, constitutes a means for performing one or more steps of providing automatic controlled value expansion of information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of providing automatic controlled value expansion of information. The display 12 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to provide automatic controlled value expansion of information. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   in response to a request, processing and/or facilitating by an apparatus performance of an information operation on a set of data elements of an information space, wherein the request identifies the set by a name and the information operation applies to one or more data elements within the set;
   determining, by the apparatus, a location of the one or more data elements based on the name;
   causing, at least in part, by the apparatus retrieval of the one or more data elements from the location;
   processing and/or facilitating by the apparatus populating an expansion table with at least the retrieved data elements, wherein the expansion table is at least substantially correlated to the set; and
   processing and/or facilitating by the apparatus performance of the information operation on all or a portion of the retrieved data elements in the expansion table.

2. A method of claim 1, further comprising:
   causing, at least in part, interception of the request.

3. A method of claim 1, wherein the information operation applies to the set and another set of data elements of the information space, the method further comprising:
   determining another location of one or more data elements of the another set;
   causing, at least in part, retrieval of the one or more data elements of the another set from the another location;
   processing and/or facilitating populating another expansion table with the retrieved data elements of the another set; and
   processing and/or facilitating performance of the information operation on permutations of one or more data elements of the expansion table and one or more data elements of the another expansion table.

4. A method of claim 1, further comprising:
   processing and/or facilitating synchronization of the one or more data elements with the location; and
   causing, at least in part, storage of the synchronized data elements locally,
   wherein the information operation is performed on the locally stored data elements.

5. A method of claim 1, wherein the expansion table is stored in one or more logically separated areas of memory.

6. A method of claim 1, wherein the name is appended with a command, the method further comprising:
   processing and/or facilitating performance of the command with respect to data elements in the information space before performing the information operation,
   wherein the command includes create, abolish, update, delete, read, or a combination thereof.

7. A method of claim 1, further comprising:
   determining an access right corresponding to the one or more data elements,
   wherein the retrieval of the one or more data elements is based, at least in part, on the determined access rights.

8. A method of claim 1, wherein the request is an internal request, an external request, or a combination thereof.

9. A method of claim 1, wherein the name is a Universal Resource Identifier (URI).

10. An apparatus comprising:
    at least one processor; and
    at least one memory including computer program code,
    the at least one memory and the computer program code configured to, with the at least one processor, cause the apparatus to perform at least the following,
    in response to a request, process and/or facilitate performance of an information operation on a set of data elements of an information space, wherein the request identifies the set by a name and the information operation applies to one or more data elements within the set;
    determine a location of the one or more data elements based on the name;
    cause, at least in part, retrieval of the one or more data elements from the location;
    process and/or facilitate populating an expansion table with at least the retrieved data elements, wherein the expansion table is at least substantially correlated to the set; and
    process and/or facilitate performance of the information operation on all or a portion of the retrieved data elements in the expansion table.

11. An apparatus of claim 10, wherein the apparatus is further caused to:
    cause, at least in part, interception of the request.

12. An apparatus of claim 10, wherein the information operation applies to the set and another set of data elements of the information space, and the apparatus is further caused to:
  determine another location of one or more data elements of the another set;
  causing, at least in part, retrieval of the one or more data elements of the another set from the another location;
  process and/or facilitate populating another expansion table with the retrieved data elements of the another set; and
  process and/or facilitate performance of the information operation on permutations of one or more data elements of the expansion table and one or more data elements of the another expansion table.

13. An apparatus of claim 10, wherein the apparatus is further caused to:
  process and/or facilitate synchronization of the one or more data elements with the location; and
  cause, at least in part, storage of the synchronized data elements locally,
  wherein the information operation is performed on the locally stored data elements.

14. An apparatus of claim 10, wherein the expansion table is stored in one or more logically separated areas of memory.

15. An apparatus of claim 10, wherein the name is appended with a command, and the apparatus is further caused to:
  process and/or facilitate performance of the command with respect to data elements in the information space before performing the information operation,
  wherein the command includes create, abolish, update, delete, read, or a combination thereof.

16. An apparatus of claim 10, wherein the apparatus is further caused to:
  determine an access right corresponding to the one or more data elements,
  wherein the retrieval of the one or more data elements is based, at least in part, on the determined access rights.

17. An apparatus of claim 10, wherein the request is an internal request, an external request, or a combination thereof.

18. An apparatus of claim 10, wherein the name is a Universal Resource Identifier (URI).

19. A non-transitory computer-readable storage medium carrying one or more sequences of one or more instructions which, when executed by one or more processors, cause an apparatus to at least perform the following steps:
  in response to a request, processing and/or facilitating performance of an information operation on a set of data elements of an information space, wherein the request identifies the set by a name and the information operation applies to one or more data elements within the set;
  determining a location of the one or more data elements based on the name;
  causing, at least in part, retrieval of the one or more data elements from the location;
  processing and/or facilitating populating an expansion table with at least the retrieved data elements, wherein the expansion table is at least substantially correlated to the set; and
  processing and/or facilitating performance of the information operation on all or a portion of the retrieved data elements in the expansion table.

20. A non-transitory computer-readable storage medium of claim 19, wherein the information operation applies to the set and another set of data elements of the information space, and the apparatus is caused to further perform:
  determining another location of one or more data elements of the another set;
  causing, at least in part, retrieval of the one or more data elements of the another set from the another location;
  processing and/or facilitating populating another expansion table with the retrieved data elements of the another set; and
  processing and/or facilitating performance of the information operation on permutations of one or more data elements of the expansion table and one or more data elements of the another expansion table.

* * * * *